United States Patent [19]

Kishi et al.

[11] Patent Number: 4,535,408

[45] Date of Patent: Aug. 13, 1985

[54] NUMERICAL CONTROL MACHINING METHOD AND APPARATUS

[75] Inventors: Hajimu Kishi, Hino; Kunio Tanaka, Hachioji; Masaki Seki, Tokyo, all of Japan

[73] Assignee: Fanuc Ltd., Minamitsuru, Japan

[21] Appl. No.: 445,371

[22] PCT Filed: Apr. 1, 1982

[86] PCT No.: PCT/JP82/00093

§ 371 Date: Nov. 26, 1982

§ 102(e) Date: Nov. 26, 1982

[87] PCT Pub. No.: WO82/03353

PCT Pub. Date: Oct. 14, 1982

[30] Foreign Application Priority Data

Apr. 1, 1981 [JP] Japan .................. 56-049195

[51] Int. Cl.³ .................. G06F 15/46; G05B 19/18
[52] U.S. Cl. .................. 364/475; 318/579; 364/167
[58] Field of Search .............. 364/474, 475, 167–171; 318/571, 578, 579

[56] References Cited

U.S. PATENT DOCUMENTS 3,174,089  3/1965  Hawkins et al. ................. 318/579
3,854,353  12/1974  Cutler .......................... 318/579 X
4,025,764  5/1977  Tack ............................ 364/474
4,173,786  11/1979  Kuhnell et al. ................. 318/571 X
4,355,362  10/1982  Imazeki et al. ................. 318/579 X
4,456,864  6/1984  Imazeki et al. ................. 318/578

Primary Examiner—Joseph Ruggiero
Attorney, Agent, or Firm—Staas & Halsey

[57] ABSTRACT

A numerical control machining method and apparatus wherein a workpiece (101) is machined on the basis of curved surface data defining a curved surface. In the numerical control machining method and apparatus, a first boundary surface (103) serving as an upper limit and a second boundary surface (104) serving as a lower limit are respectively entered as inputs. A determination is made whether a tool lies in an upper part with respect to the first boundary surface (103), between the first and second boundary surfaces, or in a lower part with respect to the second boundary surface (104), and only the curved surface ($CA_1$) enclosed by the first boundary surface (103) and the second boundary surface (104) is machined on the basis of the curved surface data. Then first and second boundary surfaces (103, 104) are moved downwards by predetermined values and the tool is moved by rapid traverse to a position ($P_{12}$) corresponding to the first boundary surface (103'). After the completion of the machining of the curved surface ($CA_1$) enclosed by the first and second boundary surfaces the next cutting operation is started from the position ($P_{12}$).

10 Claims, 6 Drawing Figures

NUMERICAL CONTROL MACHINING METHOD AND APPARATUS

BACKGROUND OF THE INVENTION

This invention relates to a numerical control machining method and apparatus wherein a workpiece is machined on the basis of curved surface data defining a curved surface. More particularly, it relates to a numerical control machining method and apparatus wherein an appointed boundary surface is entered as an upper limit or a lower limit for the machining. A determination is made whether a tool lies above or below the boundary surface to machine an upper or lower curved surface with respect to the boundary surface on the basis of the curved surface data which specifies the curved surface when the tool lies above or below the boundary surface.

When machining a metal mold in a three-dimensional shape by means of a profiling machine, it is generally impossible to immediately start the finish machining from a solid material, because of the cutting performance of a machine tool. It is therefore a general practice to rough machine the material in advance, or to finish the mold in several stages by cutting the material in small increments.

A clamp profiling system has been previously proposed in order to perform the rough machining and the finish machining or to perform the several machining stages, as described above, and it has demonstrated its effectiveness. The clamp profiling system is a method wherein a clamp height is previously set so that the material may be cut down to a depth to which the machine tool can cut, the clamp height is lowered at each profiling operation, and the machining of the whole surface of the three-dimensional shape is completed by several profiling operations. With this system, however, the tool strokes the already cut surfaces at low speed in the second and subsequent operations and executes useless motion, which leads to the disadvantage of prolonged machining time.

On the other hand, in a situation where NC (numerical control) command data for machining the curved surface of a metal mold is automatically created by the use of an automatic programming system and where the metal mold is machined on the basis of the NC command data, a first part program for rough machining and a first part program for finish machining must be created and prepared separately from each other. This is disadvantageous in that programming becomes complicated and a memory having a large capacity is required.

SUMMARY OF THE INVENTION

The present invention has an object of providing a numerical control machining method and apparatus which can shorten the machining time of a curved surface and which do not require two part programs, one part for rough machining and one part for finish machining.

In a numerical control machining system in which a workpiece is machined on the basis of curved surface data which defines a curved surface, the present invention is constructed so that first boundary surface data serving as an upper limit and second boundary surface data serving as a lower limit are respectively entered. A determination is made whether a tool lies above the first boundary surface, between the first and second boundary surfaces or below the second boundary surface. A curved surface enclosed by the first boundary surface and second boundary surface is machined on the basis of the curved surface data, and each time the curved surface enclosed by the first and second boundary surfaces has been machined, these first and second boundary surfaces are moved down. The tool is also moved by a rapid-traverse to a position which is determined by the new boundary surfaces and the machining of a curved surface is thereafter started from this position. As a result, according to the present invention, the curved surface can be machined at predetermined cut-depth increments through purely electrical means, and the previously machined surface is not stroked at low speed, so that the machining time can be shortened. Moreover, the invention can be utilized when machining a metal mold, etc. by the use of an automatic programming system. In this case, only one part program for finish machining may be prepared, so that the programming can be simplified and the memory reduced in capacity.

BRIEF DESCRIPTION OF THE DRAWINGS

FIGS. 1 and 2 are diagrams for explaining an embodiment of the present invention, in which FIG. 1 is a diagram of a machining procedure, while FIG. 2 is a block diagram of the embodiment;

DESCRIPTION OF THE PREFERRED EMBODIMENTS

The present invention will now be described with reference to the accompanying drawings in order to expound it more in detail.

Figure 1:
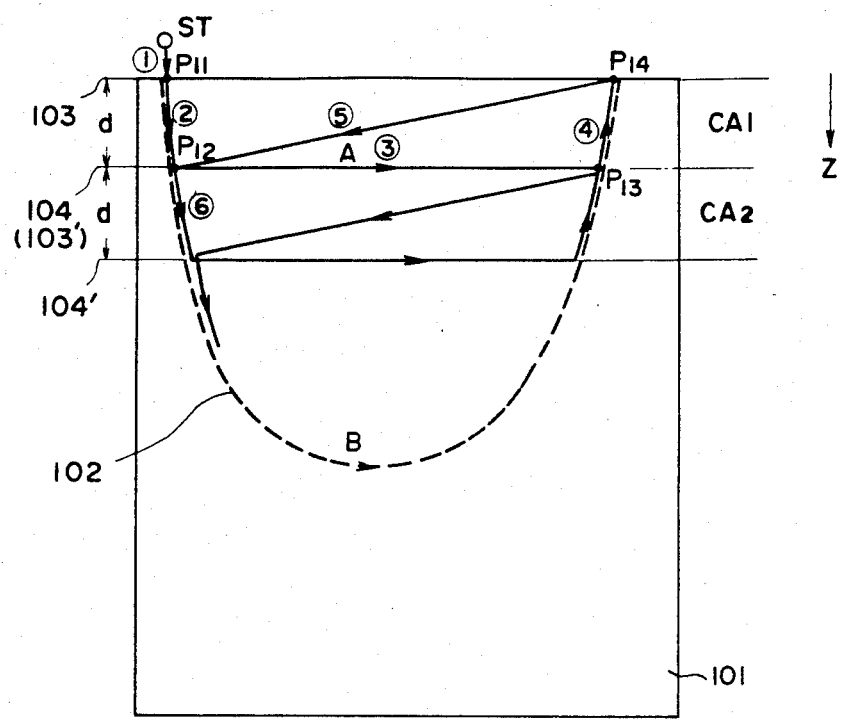
Figure 2:
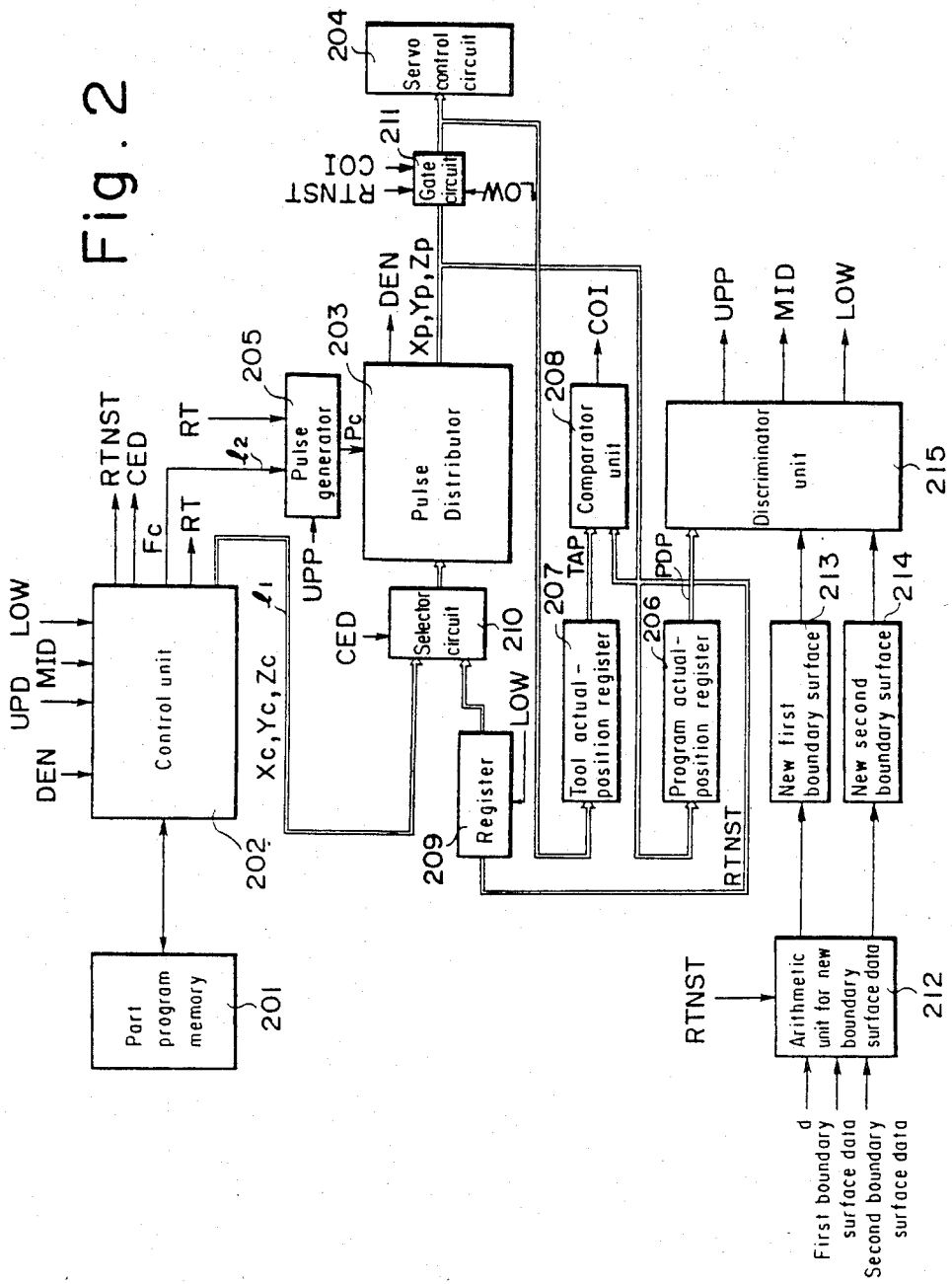

FIGS. 1 and 2 are diagrams for explaining an embodiment of the present invention, in which FIG. 1 is a diagram for explaining the machining procedure of the embodiment, while FIG. 2 is a block diagram of the embodiment.

In FIG. 1, numeral 101 designates a solid material, namely, a workpiece, numeral 102 a desired curved surface, numerals 103 and 104 first and second boundary surfaces which define the upper and lower limits of a cutting area, and symbol ST the starting point of a tool. FIG. 1 illustrates a cut section of the workpiece 101.

In the present invention, only a part program for finish machining, in other words, a part program for specifying the desired final curved surface 102 is stored in a memory to be described later. Information items on the first and second boundary surfaces 103, 104 for appointing the upper and lower limits of the cutting area are entered separately. For the convenience of the description, the boundary surfaces 103 and 104 are assumed to be parallel to the XY-plane, but they may be oblique planes. The machining of the curved surface 102 is performed by the following procedure:

(1) The tool is moved from the starting point ST until the workpiece is cut down to the lower-limit boundary surface 104 (the machining of the cutting area enclosed by the first and second boundary surfaces).... Refer to ① and ② in FIG. 1.

(2) Subsequently, the movement in the Z-axis direction is stopped, and the tool is moved along the lower-limit boundary surface 104 (the machining of the lower-limit boundary surface). This is achieved by inhibiting the distributed pulses of the Z-axis from entering a Z-axis servo control circuit. Thereafter, a pulse distribution position and a tool actual position no longer coincide for a period of time. . . . Refer to ③ in FIG. 1.

(3) As the pulse distribution proceeds on the basis of the movement data of the part program, the pulse distribution position moves in the direction of an arrow along a dotted line until it coincides with the actual tool position at a point $P_{13}$. . . . Refer to ③ in FIG. 1.

(4) Thereafter, the tool is moved also in the Z-axis direction again until the workpiece is cut up to the upper-limit boundary surface 103 (the machining of the area enclosed by the first and second boundary surfaces). . . . Refer to ④ in FIG. 1.

(5) Subsequently, using the positional data of a point $P_{12}$ stored in the above stages (1)-(4), the tool is moved from a point $P_{14}$ to the point $P_{12}$ by a rapid-traverse. . . . Refer to ⑤ in FIG. 1.

(6) Thereafter, the information items for new boundary surfaces 103' and 104' are entered or calculated, the part program is restricted from the beginning, and the pulse distribution is performed by rapid-traverse on the basis of movement data. At this time, the movements of the tool in the X-, Y- and Z-axis directions are stopped. Accordingly, only the pulse distribution position moves along the dotted line from the start point ST. The pulse distribution position and the actual tool position coincide in a short period of time at the point $P_{12}$. Upon coincidence, the tool starts moving in the X-, Y- and Z-axis directions at a commanded machining speed again and cuts the workpiece down to the lower-limit boundary surface 104'. . . . Refer to ⑥ in FIG. 1.

When the steps of procedure (2)-(6) are thereafter repeated, the machining of the final shape of the dotted line is completed.

In the above description, it has been assumed that when the cutting of the area enclosed by the first and second boundary surfaces has ended, the second boundary surface becomes (agrees with) the upper limit of the next cutting area, however, this agreement is not always necessary. In addition, for the convenience of description, it has been assumed that the tool is positioned at the point $P_{12}$ by the sequence (5) immediately after the completion of the sequence (4). In machining an actual three-dimensional curved surface, however, there is a process where, at the end of cutting the curved surface section enclosed by the curved surface 101 and the boundary surfaces 103, 104, the tool is pick-fed in the X and Y directions by predetermined values after the sequence (4), whereupon the sequences (1)-(4) are repeated. After the whole curved surface section enclosed by the curved surface 101 and the boundary surfaces 103, 104 have been cut by repeating the pick feed and the sequences (1)-(4), the operation shifts to the sequence (5).

Next, the block diagram of FIG. 2 will be described with reference to FIG. 1.

In FIG. 2, the following numerals designate the following elements, numeral 201 a part program memory which stores the part program of a curved surface prepared by the automatic programming system, numeral 202 a control unit which generates various control signals and which reads out cutting data or movement data items from the memory 201, numeral 203 a pulse distributor which is supplied with the numerical values Xc, Yc and Zc indicative of movement values along the respective axes X, Y and Z and a train of pulses Pc indicative of a commanded speed and which is generated in a known pulse distribution computation, numeral 204 a servo control circuit for the respective axes, numeral 205 a pulse generator which generates the pulse train Pc at a frequency corresponding to the speed command, numeral 206 a program actual-position register which counts distributed pulses Xp, Yp and Zp reversibly in accordance with the directions of movements and which stores a pulse distribution position, numeral 207 a tool actual-position register which stores the actual position of the tool, numeral 208 a comparator unit which decides whether the pulse distribution position and the tool actual position coincide, numeral 209 a register in which, when the tool has traversed to the lower-limit boundary surface and is about to enter the lower area, the actual tool position at that time is set, numeral 210 a selection circuit which properly selects the numerical values of the movement values of the part program or the content of the register 209, and numeral 211 a gate circuit which inhibits the passage of the distributed pulses Xp, Yp and Zp along all the axes, inhibits the passage of only the distributed pulses Zp of the Z-axis or delivers the distributed pulses along all the axes to the serve control circuit 204, in accordance with the pulse distribution position.

Shown at numeral 212 is an arithmetic unit which calculates new boundary surface data. In the present embodiment, the first and second boundary surfaces 103, 104 of the first cutting area $CA_1$ (FIG. 1) and the distance d (FIG. 1) to the next cutting area are entered as inputs. The arithmetic unit 212 therefore uses this data to calculate the data for the new boundary surfaces 103', 104' which specify the next cutting area. It should be noted that the first boundary surface 103' (upper boundary) of the next cutting area $CA_2$ may be above the second boundary surface 104 (lower boundary) of the preceding cutting area $CA_1$.

Numerals 213 and 214 indicate a new first boundary surface register and a new second boundary surface register which store the first and second boundary surface data of the next cutting area, respectively. Numeral 215 indicates a discriminator unit which determines whether the pulse distribution position lies above the first boundary surface (the upper part with respect to the cutting area), within the cutting area, or below the second boundary surface (the lower part with respect to the cutting area) and which delivers signals UPP, MID and LOW when the pulse distribution position lies in the upper part with respect to the cutting area, in the cutting area and in the lower part with respect to the cutting area, respectively. Symbol DEN denotes a pulse distribution end signal.

When the apparatus is started, the control unit 202 reads out the part program from the memory 201. It responds to M, S or T function instruction data to deliver the data to the machine side through a power sequence circuit (not shown), and it responds to movement command data to deliver the numerical movement values Xc, Yc and Zc and the feed speed Fc to lines $l_1$ and $l_2$. Thus, the pulse distributor 203 starts the pulse distribution computation and delivers the distributed pulses Xp, Yp and Zp. The distributed pulses Xp, Yp and Zp are fed into the program actual-position register 206 which counts reversibly in accordance with the moving directions, whereupon an output is provided as the pulse distribution position PDP. The distributed pulses Xp, Yp and Zp are also applied to the servo control circuit 204 through the gate circuit 211. As a result, the tool moves from the start point ST toward the point $P_{12}$ to machine the cutting area $CA_1$. Further, the distributed pulses Xp, Yp and Zp which are output to the servo control circuit 204 are applied to the tool actual-position register 207 and are counted reversibly in accordance with the moving directions, whereupon an output is provided as the tool actual position TAP. . . . Refer to ① and ② in FIG. 1.

Meanwhile, the discriminator unit 215 is normally discriminating whether the pulse distribution position lies within the cutting area or above or below it. When the machining operation in accordance with the part program has proceeded until the pulse distribution position PDP (which is in agreement with the tool actual position TAP in ① and ② of FIG. 1) has entered the lower part with respect to the cutting area, the discriminator unit 215 immediately provides the signal LOW (="1") and sets the pulse distribution position PDP (tool actual position TAP), at this point of time, in the register 209. At the same time, the gate circuit 211 inhibits the passage of the distributed pulses Zp in the Z-axis direction and allows the passage of only the distributed pulses Xp and Yp in the X- and Y-axial directions.

The pulse distributor 203 generates the distributed pulses Xp, Yp and Zp by executing the pulse distribution computation on the basis of the movement data of the part program. However, the tool does not move in the Z-axis direction but moves in the direction of an arrow A along the second boundary surface 104. Since, however, the respective distributed pulses Xp, Yp and Zp are applied to the program actual-position register 206, the pulse distribution position moves in the direction of an arrow B indicated by the dotted line. . . . Refer to ③ in FIG. 1.

As the aforementioned steps proceed, the actual tool position TAP and the pulse distribution position PDP coincide in due course. Upon coincidence, the comparator unit 208 delivers a coincidence signal COI (="1"), and the gate circuit 211 delivers the distributed pulses along all the axes again. As a result, the tool becomes movable in the Z-axis direction, and the machining of the curved surface in the cutting area $CA_1$ begins again on the basis of the part program. . . . Refer to ④ in FIG. 1.

When the machining of the curved surface in the cutting area $CA_1$ has preceeded until the pulse distribution position has entered the upper part with respect to the cutting area beyond (above) the first boundary surface, the discriminator unit 215 delivers the signals UPP (="1"). Thus, the control unit 202 delivers a cycle end signal CED (="1") and a rapid traverse signal RT. The pulse distribution computation is immediately stopped by the signal CED. In addition, the content of the point $P_{12}$ set in the register 209 is applied to the pulse distributor 203 through the selector circuit 210. As a result, the tool is moved to the point $P_{12}$ by the rapid traverse operation. . . . Refer to ⑤ in FIG. 1.

When the positioning of the tool to the point $P_{12}$ has ended, a return to start signal RTNST (="1") is provided by the control unit 202. This signal clears the content of the program actual-position register 206, causes the gate circuit 211 to close the gates for all the axes (to inhibit the passage of the distributed pulses of the respective axes), and causes the arithmetic unit 212 to calculate the first and second boundary surface data of the second cutting area $CA_2$ and to set them in the respective registers 213, 214. Thereafter, the same part program is restarted from the beginning. Since, at this time, the pulse distribution position exists in the upper part with respect to the cutting area $CA_2$, the signal UPP is at "1". Therefore, the train of pulses Pc having the rapid traverse frequency is applied from the pulse generator 205 to the pulse distributor 203.

Accordingly, the pulse distribution position PDP moves from the start point ST toward the point $P_{12}$ at high speed. Meanwhile, the tool does not move because the gate circuit 211 has the gates for all the axes closed. When the pulse distribution position PDP, continuously stored in register 206 has moved to coincide with the actual tool position TAP, stored in register 207, the coincidence signal COI (="1") is delivered by the comparator unit 208. The gate circuit 211 has the gates of all the axes opened by this coincidence signal, to deliver the distributed pulses Xp, Yp and Zp to the servo control circuit 204 and also to the tool actual-position register 211. Accordingly, the tool starts moving in the X-, Y- and Z-axis directions at the commanded speed and cuts the workpiece down to the lower-limit boundary surface 104'. . . . Refer to ⑥ in FIG. 1.

When the steps of procedure (2)–(6) are thereafter repeated, the machining of the desired curved surface 102 (FIG. 1) is completed.

Figure 3:
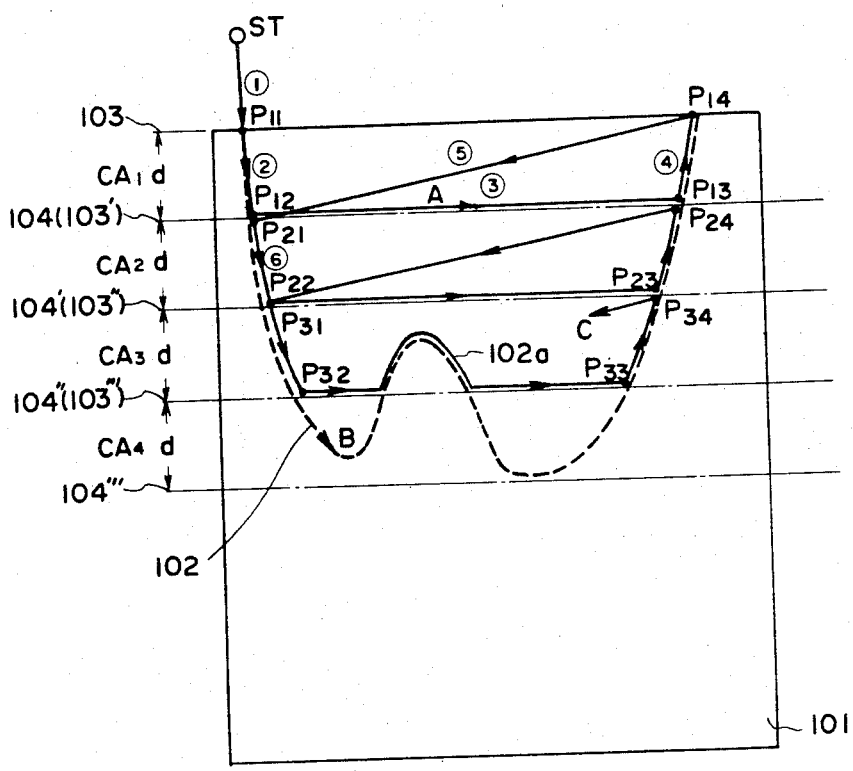
FIGS. 3 and 4 are diagrams for explaining a machining procedure in a case where a convex portion exists in the lower part of a curved surface.
Figure 4:
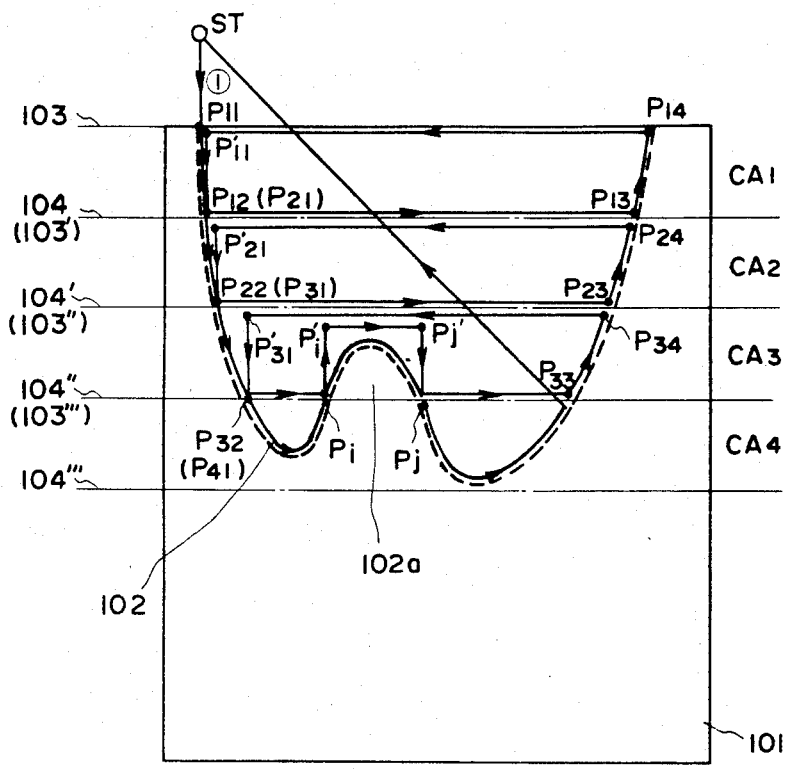

According to the above technique, even when a convex portion 102a exists in the lower part of a curved surface 101 as shown in FIG. 3, the tool can move along the convex portion so as to perform desired cutting. When, in case of executing the cutting as shown in FIG. 3, the tool is moved from a point $P_{34}$ to a point $P_{32}$ along an arrow C, the tool abuts against the convex portion 102a. In such case, the tool may be moved from the point $P_{34}$ through a point $P_{31}'$ to the point $P_{32}$ as illustrated in FIG. 4. In addition, the machining time period can be shortened still more in such a way that, when the tool has reached a point $P_i$ during the machining of a cutting area $CA_4$ (refer to FIG. 4), it is fed along a path $P_i \rightarrow P_i' \rightarrow P_j' \rightarrow P_j$ by a rapid-traverse.

Figure 5:
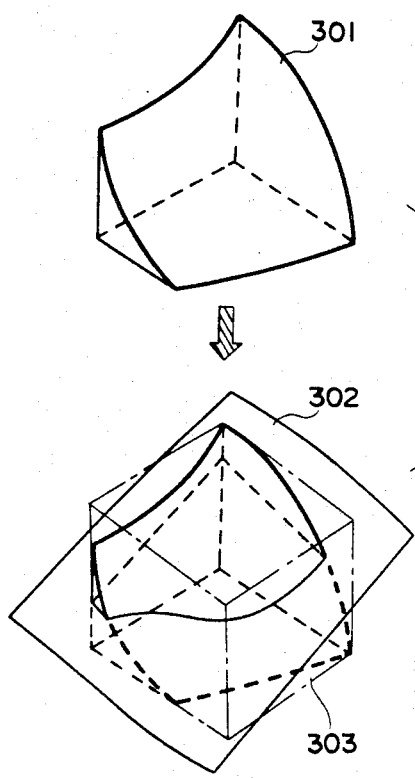
FIGS. 5 and 6 are diagrams for explaining further embodiments of the present invention.

The above description has referred to the case where the two boundary surfaces serving as the upper limit and the lower limit are commanded, the area defined between both the boundary surfaces is set as the cutting area and only this cutting area is machined. It is also possible, however, to input only one boundary surface serving as the upper limit or lower limit and to set the lower limit or upper limit with respect to the one boundary surface as the cutting area. FIG. 5 is an explanatory diagram for such as case. Numeral 301 designates the curved surface of a model or a curved surface created in profiling, numeral 302 the boundary surface, and numeral 303 a workpiece.

Figure 6:
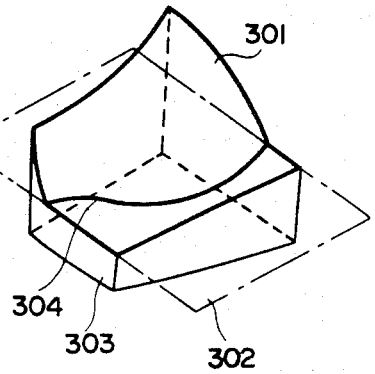

As illustrated in FIG. 6, it is also possible to machine one side of a workpiece with the border at a curve 304, at which a curved surface 301 and a boundary surface 302 intersect, on the basis of the data of the curved surface 301 and to machine the other side so as to agree with the boundary surface 302. In this case, the machining of the boundary surface can be effected by inhibiting the movement of the tool in the Z-axis direction.

Further, the boundary surface is not restricted to a horizontal plane having a fixed Z-coordinate value, but it may be any desired oblique plane, spherical surface or cylindrical surface.

In addition, the present invention is not restricted to a case where a curved surface is created and a workpiece is machined on the basis of data indicative of the curved surface, but is applicable to profiling as well.

As described above in datail, according to the present invention, a curved surface can be machined at predetermined cut-depth increments, and an already cut surface is not stroked at low speeed, so that the machining time period can be shortened remarkably. Moreover, in case of machining a metal mold or the like by the use of the automatic programming system, only one part program for finish machining may be prepared, so that the programming can be simply effected and the invention is well suited for use in numerical control machining.

What is claimed is:

1. A numerical control machining method in which a workpiece is machined on the basis of curved surface data defining a curved surface, comprising the steps of:
   (a) entering an appointed boundary surface as a first machining limit;
   (b) determining a second machining limit from the first machining limit;
   (c) discriminating whether a tool lies between the first and second machining limits;
   (d) machining on the basis of said curved surface data when said tool lies between the first and second machining limits and machining on the basis of both said curved surface data not outside the first and second machining limits and the machining limit exceeded when said tool would be outside the machining limit exceeded;
   (e) setting the first machining limit to the second machining limit and rapid feeding the tool to the intersection of the first machining limit and said curved surface data when it reaches the first machining limit while machining on the basis of said curved surface data; and
   (f) returning to step (b).

2. A numerical control machining method as defined in claim 1, wherein step (c) comprises machining one side of the workpiece with a border at a curve at which the curve surface and the boundary surface intersect, on the basis of said curved surface data, and the step of machining the other side to agree with said boundary surface.

3. A numerical control machining method wherein a workpiece is machined on the basis of curved surface data defining a curved surface, comprising te steps of:
   (a) entering as inputs a first boundary surface serving as an upper machining limit and a second boundary surface serving as a lower machining limit, respectively;
   (b) discriminating whether a tool lies in an upper part with respect to said first boundary surface, between said first and second boundary surfaces, or in a lower part with respect to said second boundary surface;
   (c) machining the curved surface by said first and second boundary surfaces, on the basis of the curved surface data and when the tool path defined in the curved surface data is outside the area enclosed by said first and second boundary surfaces causing the tool to remain on the boundary surface exceeded;
   (d) changing the upper and lower machining limits and boundary surfaces when the cutting between the first and second boundary surfaces is completed;
   (e) rapid traversing the tool to the intersection of the changed iupper machining limit and a first point where said curved surface data coincides with the changed upper machining limit; and
   (f) executing the curved surface data at a rapid traverse rate while the tool remains at the intersection and returning to step (c).

4. A numerical control machining method as defined in claim 3, wherein step (c) comprises the steps of:
   (ci) machining one side of the workpiece with a border at a curve at which the curved surface and the second boundary surface intersect, on the basis of said curved surface data; and
   (cii) machining the other side of the workpiece to agree with said second boundary surface.

5. A numerical control machining method as defined in claim 4, wherein values of the change of said first and second boundary surfaces are entered in advance.

6. A numerical control machining method as defined in claim 3, wherein step (c) comprises the steps of:
   (ci) executing a pulse distribution computation by the use of the curved surface data; and
   (cii) moving the tool along a desired curved surface on the basis of distributed pulses obtained by the pulse distribution.

7. A numerical control machining method wherein a workpiece is machined on the basis of curved surface data defining a curved surface, comprising the steps of:
   (a) setting a first boundary surface serving as an upper machining limit and a second boundary surface serving as a lower machining limit, respectively;
   (b) discriminating whether a tool lies in an upper part with respect to said first boundary surface, between said first and second boundary surfaces, or in a lower part with respect to said second bouneary surface;
   (c) machining only the curved surface enclosed by said first and second boundary surfaces, on the basis of the curved surface data in accordance with a result of the discrimination;
   (d) moving said first and second boundary surfaces downwards by predetermined values after completion of the machining of the curved surface enclosed by said first and second boundary surfaces;
   (e) moving the tool to a position corresponding to the first boundary surface set anew, by rapid traverse; and
   (f) starting the next cutting operation from said position on the basis of said curved surface data.

8. A numerical control machining method where a workpiece is machined on the basis of curved surface data defining a curved surface, comprising the steps of:
   (a) setting a first boundary surface serving as an upper machining limit and a second boundary surface serving as a lower machining limit, respectively;
   (b) discriminating whether a tool lies in an upper part with respect to said first boundary surface, between said first and second boundary surfaces, or in a lower part with respect to said second boundary surface;
   (c) machining only the curved surface enclosed by said first and second boundary surfaces, on the basis of the curved surface data in accordance with a result of the discrimination;
   (d) moving said first and second boundary surfaces downwards by predetermined values after completion of the machining of the curved surface enclosed by said first and second boundary surfaces;

(e) moving the tool to a position corresponding to the first boundary surface set anew, by rapid transverse; and (f) starting the next cutting operation from said position comprising the steps of:

(fi) counting pulses, generated by a pulse distribution computation based on the curved surface data, reversibly in accordance with the moving direction and storing a result as a pulse distribution position;

(fii) storing an actual position of the tool;

(fiii) executing the pulse distribution computation at high speed and simultaneously locking the movement of the tool when the pulse distribution position lies above said first boundary surface;

(fiv) executing the pulse distribution computation at a cutting feed and simultaneously moving the tool on the basis of the distributed pulses when the pulse distribution position has coincided with the actual tool position;

(fv) locking the feed of the tool in a Z-axis direction after the pulse distribution position has arrived on said second boundary surface; and (fvi) restarting the feed of the tool in the Z-axis direction when the pulse distribution position has arrived on said second boundary surface again.

9. A numerical control machining apparatus wherein a workpiece is machined on the basis of curved surface data defining a curved surcace, comprising:

means for storing a first boundary surface serving as an upper machining limit and a second boundary surface serving as a lower machining limit, respectively;

discrimination means, operatively connected to said means for storing, for discriminating whether a tool would lie above said first boundary surface, between said first and second boundary surfaces, or below said second boundary surface in dependence upon the curved surface data;

control means, operatively connected to said discrimination means, for moving the tool along the curved surface when between said first and second boundary surfaces, on the basis of the curved surface data in accordance with a result of the discrimination and for moving the tool along said second boundary surface when the curved surface data would position the tool below the lower machining limit on the basis of the curved surface data;

boundary surface setting means, operatively connected to said means for storing, for moving said first and second boundary surfaces downward by predetermined values after completion of the machining of the curved surface enclosed by said first and second boundary surfaces;

rapid traverse means, operatively connected to said control means and said discrimination means, for moving the tool to a position corresponding to the first boundary surface set anew, by rapid traverse; and means, operatively connected to said rapid traverse means, said discrimination means and said control means, for starting the next cutting operation from said position.

10. A numeric 1 control machining method for a workpiece using a machine tool in accordance with part data having first and second components orthogonal to each other and produced by a control unit, comprising the steps of:

(a) moving the machine tool from a start position to a first boundary surface by rapid traverse;

(b) machining from the first boundary surface to a second boundary surface and part data intersection point in dependence upon the part data produced by the control unit;

(c) moving the machine tool and machining along the second boundary surface in dependence upon the second component when the first component produced by the control unit indicates machining outside the second boundary surface;

(d) machining from the second boundary surface to the first boundary surface and part data intersection point in dependence upon the part data;

(e) terminating machining based on the part data when the first boundary surface and part data intersection point is reached;

(f) moving the tool from the first boundary surface and part data intersection point to the second boundary surface and part data intersection point by rapid traverse;

(g) calculating new first and second boundary surfaces where the new first boundary surface equals the previous second boundary surface;

(h) holding the machine tool at the new first boundary surface and part data intersection point until the part data produced by the control unit at a rapid traverse rate coincides with the new first boundary surface and part data intersection point; and (i) repeating steps (b)–(h) until machining of the workpiece is finished.

* * * * *

UNITED STATES PATENT AND TRADEMARK OFFICE
CERTIFICATE OF CORRECTION

PATENT NO. : 4,535,408   Page 1 of 2
DATED : AUGUST 13, 1985
INVENTOR(S) : HAJIMU KISHI ET AL.

It is certified that error appears in the above-identified patent and that said Letters Patent is hereby corrected as shown below:

```
Col. 1, line 22, delete ",";
        line 23, "a" (first occurrence) should be --the--;
        line 48, "first" should be --second--.

Col. 2, line 4, delete ",".

Col. 3, line 26, "restricted" should be --restarted--.

Col. 4, line 63, delete ",".

Col. 5, line 56, "signals" should be --signal--.

Col. 6, line 18, after "206" insert --,--;
        line 55, "as" should be --a--.

Col. 7, line 50, "te" should be --the--;
        line 60, after "surface" insert --enclosed--.

Col. 8, line 4, "iupper" should be --upper--;
        line 37, "bouneary" should be --boundary--.
```

UNITED STATES PATENT AND TRADEMARK OFFICE
CERTIFICATE OF CORRECTION

PATENT NO.   : 4,535,408
DATED        : AUGUST 13, 1985
INVENTOR(S)  : HAJIMU KISHI ET AL.

It is certified that error appears in the above-identified patent and that said Letters Patent is hereby corrected as shown below:

Col. 9, line 34, "surcace" should be --surface--.

Col. 10, line 16, "numeric 1" should be --numerical--.

Signed and Sealed this

Third Day of December 1985

[SEAL]

Attest:

DONALD J. QUIGG

Attesting Officer

Commissioner of Patents and Trademarks